United States Patent [19]
Allen, III et al.

[11] Patent Number: 5,136,195
[45] Date of Patent: Aug. 4, 1992

[54] BRUSHLESS TWO-POLE GENERATOR MAIN FIELD LEADS CONNECTION TO RECTIFIER ASSEMBLY

[75] Inventors: Frank W. Allen, III; Michael R. Hernden; Mohammed F. Shahamat, all of Rockford, Ill.

[73] Assignee: Sundstrand Corporation, Rockford, Ill.

[21] Appl. No.: 570,558

[22] Filed: Aug. 21, 1990

[51] Int. Cl.$^5$ .................. H02K 19/38; H02K 11/00
[52] U.S. Cl. ..................................... 310/68 D; 310/71
[58] Field of Search .............. 310/71, 68 D, 68 R; 363/141, 144, 145

[56] References Cited

U.S. PATENT DOCUMENTS

| | | | |
|---|---|---|---|
| 2,722,652 | 11/1955 | Brainard | 322/25 |
| 2,735,030 | 2/1956 | Brainard | 310/261 |
| 2,897,383 | 3/1957 | Barrows et al. | 310/68 D |
| 3,381,209 | 4/1968 | Richardson et al. | 322/59 |
| 3,412,271 | 11/1968 | Hall | 310/68 R |
| 3,501,659 | 3/1970 | Pannell | 310/68 R |
| 3,562,564 | 2/1971 | Potter | 310/54 |
| 3,577,002 | 5/1971 | Hall et al. | 290/46 |
| 4,289,989 | 9/1981 | Schibline | 310/261 |
| 4,389,585 | 6/1983 | Yamaguchi et al. | 310/52 |
| 4,482,827 | 11/1984 | Baldwin | 310/68 D |
| 4,570,094 | 2/1986 | Trommer | 310/68 R |
| 4,603,344 | 7/1986 | Trommer | 357/76 |
| 4,628,219 | 12/1986 | Troscinski | 310/68 D |
| 4,672,248 | 6/1987 | Heyne et al. | 310/68 D |
| 4,745,315 | 5/1988 | Terry, Jr. et al. | 310/68 D |
| 4,794,285 | 12/1988 | Nimura | 310/68 D |
| 4,806,814 | 2/1989 | Nold | 310/68 D |
| 4,827,165 | 5/1989 | Nold | 310/68 D |
| 4,900,959 | 2/1990 | Drinkut et al. | 310/68 D |

FOREIGN PATENT DOCUMENTS

| | | | |
|---|---|---|---|
| 1192584 | 5/1965 | Fed. Rep. of Germany | 310/71 |
| 1663153 | 3/1970 | Fed. Rep. of Germany | 310/68 D |
| 2722200 | 11/1978 | Fed. Rep. of Germany | 310/68 D |
| 0121441 | 5/1988 | Japan | 310/71 |
| 8503390 | 8/1985 | PCT Int'l Appl. | 310/68 D |
| 644586 | 10/1950 | United Kingdom | 310/68 D |

Primary Examiner—Steven L. Stephan
Assistant Examiner—Dennis R. Haszko
Attorney, Agent, or Firm—Antonelli, Terry, Stout & Kraus

[57] ABSTRACT

An electric generator and a method of securing a connection between flexible electrical leads from a rectifier and a main field winding in a rotor of the generator wherein the leads are arranged so that they extend through a generally axially extending hole in the rotor with their free ends being connected in a parallel splice configuration which extends radially outward from the hole with the connected free ends being secured with respect to the rotor so as to remain in the radially outward extending position during rotation of the rotor. The rectifier is located at one end of the magnetic core and field winding of the main generator with the rectifier leads extending through a hole in the magnetic core and a field winding insulator to the opposite end of the magnetic core and field winding for connection with the field winding leads. Rotational forces will not pull the lead wire connections apart and the connections are readily accessible for repair.

14 Claims, 2 Drawing Sheets

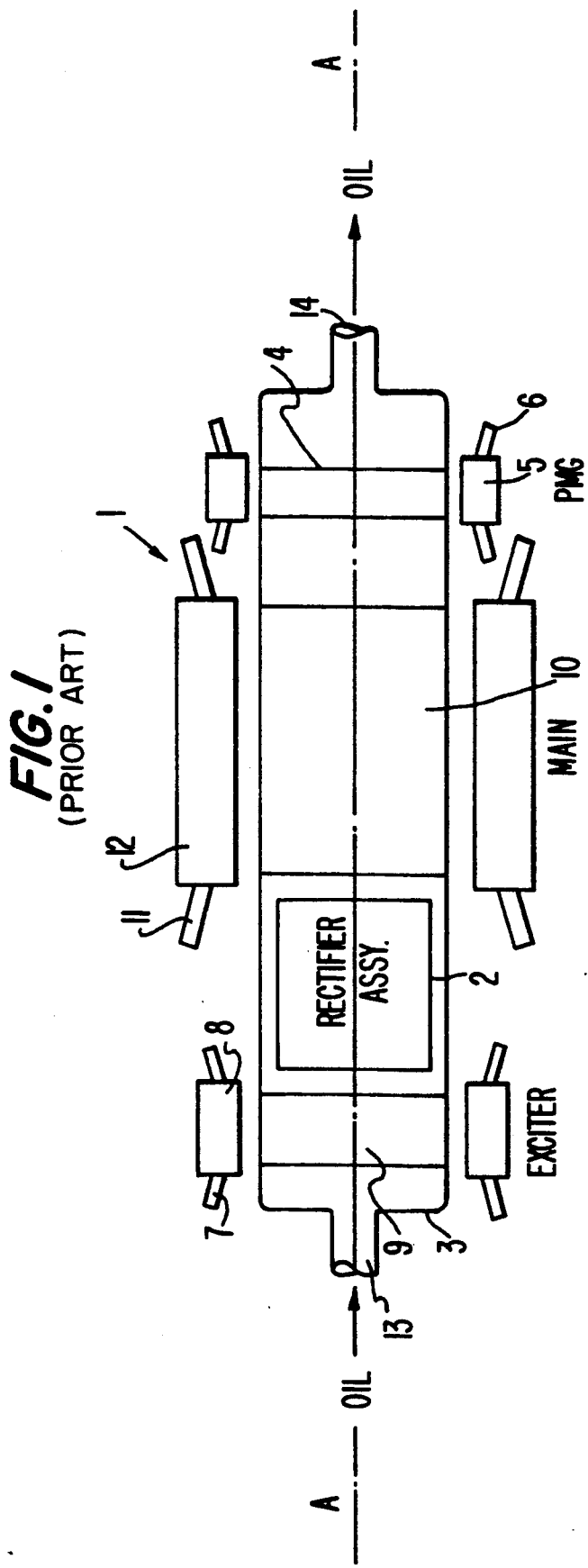

BRUSHLESS TWO-POLE GENERATOR MAIN FIELD LEADS CONNECTION TO RECTIFIER ASSEMBLY

TECHNICAL FIELD

The present invention relates to an electric generator, particularly a brushless two-pole generator, and a method of securing connections between flexible electrical leads of electrical components of a rotor of the generator against rotational forces and low cycle start-stop fatigue.

BACKGROUND ART

It is known to employ rotating rectifier assemblies in generators, such as high speed generators utilized in aircraft. The use of rotating rectifier assemblies permits the elimination of brushes which frequently require maintenance and/or replacement.

A typical brushless generator has three distinct generating systems, including a main generator, an exciter and a permanent magnetic generator. The permanent magnetic generator includes permanent magnets for establishing a magnetic field which is employed to induce a current field in a set of windings. This induced current in turn generates a magnetic field in the exciter; and this magnetic field in turn induces an even higher level of current, typically three-phase alternating, which is then used to generate a magnetic field for the main generator.

In order to avoid the use of brushes, it is necessary that the magnetic field and the main generator be in the rotor so that the output of the system can be taken from the stator of the main generator. To generate a suitable magnetic field in the rotor, it is necessary to utilize direct current, as opposed to alternating current. Since the output of the exciter is an alternating current, this current must be rectified to direct current. A rectifier assembly is used for this purpose. In order to avoid resort to brushes, it is necessary that the rectifier assembly interconnecting the exciter and the main generator field winding be carried by the rotor of the generator. U.S. Pat. Nos. 4,570,094; 4,603,344 and 4,628,219 disclose examples of known rotating rectifier assemblies.

Where the rotating rectifier assembly is located to one side of the core and field winding of the main generator in the generator rotor, it is known to use plugs located adjacent the rectifier for making electrical connections between the rectifier leads and the main generator and field winding leads. One disadvantage of this known generator is that it does not permit repair of the field leads adjacent the plugs in the event of lead breakages.

There is a need for an improved generator and a method of securing a connection between the rectifier and field winding leads which avoid the aforementioned disadvantage such that the connections are accessible for repair while at the same time not interfering with the field winding process or hindering the magnetic flux path. Field magnetic wire to flexible rectifier lead wire connections must also be easily made and secured against high centrifugal loading and start-stop fatigue as the rotators may rotate at speeds of 24,000 rpm or higher.

U.S. Pat. No. 2,897,383 to Barrows discloses a brushless alternating current dynamoelectric machine wherein a rectifier assembly is disposed within a hollow shaft and the alternating current input terminals are connected to the exciter armature winding by conductors and the direct current output terminals are similarly connected to the generator field winding. The following patents generally disclose rotor structures which incorporate rectifiers or the like:

| | | | |
|---|---|---|---|
| 4,389,525 | Yamaguchi | 4,289,989 | Schibline |
| 4,745,315 | Terry | 3,412,271 | Hall |
| 3,501,659 | Pannell | 3,577,002 | Hall |
| 3,381,209 | Richardson | | |

DISCLOSURE OF INVENTION

An object of the present invention is to provide an improved electric generator and a method of securing connections between flexible electrical leads in a rotor of the generator, wherein the connections between leads from the main generator winding and a rectifier are readily accessible and arranged in a manner which does not interfere with the field winding process or hinder the magnetic flux path. A further object of the invention is to provide an improved generator and a method of securing connections between the flexible electrical leads in a rotor thereof, wherein the connections and the leads are arranged so that rotation forces will not pull the lead wire connections apart with rotation of the rotor at speeds of 24,000 rpm or higher, and wherein low cycle start-stop fatigue will not degrade the wire connections.

These and other objects of the invention are attained by the improved electric generator of the invention which comprises an exciter and a main generator, the exciter and the main generator having a common rotor which is supported for rotation about an axis of the rotor, the rotor including a magnetic core and field winding of the main generator, an exciter winding and a rectifier for rectifying the electrical output of the exciter winding for transmission to the field winding of the main generator. The exciter winding and the rectifier are located to one side of the magnetic core and field winding of the main generator in a direction along the axis of the rotation of the rotor. Electrical leads from the rectifier extend through a hole in the rotor to the other side of the magnetic core and field winding opposite the one side, where they are connected to respective leads from the field winding. According to the disclosed embodiment, the hole through the rotor extends along the axis of rotation of the rotor through the magnetic core of the main generator from one side of the core and field winding to the other. The connections of the field winding leads and the rectifier leads are located radially outward from the axis and hole.

More particularly, the electric generator further comprises a field winding insulator provided over the field winding at least adjacent the other side of the field winding. The electrical connections of the field winding leads and the rectifier leads are located adjacent the insulator where they are accessible for repair. According to a further feature of the invention, the hole through the rotor for the leads includes a hole in the insulator through which both the rectifier leads and the field winding leads extend. The ends of the field winding leads and the rectifier leads are arranged in parallel splice configurations in the locations of the electrical connections. The parallel splice configurations extend radially outward from the axis and the hole in the insulator and are secured to the insulator so that rotation forces will not pull the lead connections apart. The electrical connections of the free ends of the lead wires can be made by soldering, brazing, crimping, or with the use of compressive devices such as screw terminals.

The disclosed, preferred embodiment of the improved generator of the invention is a brushless two-pole generator. Spaced bearings support the rotor of the generator for rotation about its axis. The magnetic core and field winding of the main generator are located within an external shaft of the rotor which transmits torsion along the rotor and gives support between the bearings while the shaft is rotating.

From the above, it can be seen that the method of the invention for securing a connection between at least two flexible electrical leads of electrical components of a rotor which is rotated about an axis of the rotor, comprises arranging the leads so that they extend through a generally axially extending hole in the rotor with their free ends being connected in a parallel splice configuration of the ends, which parallel splice configuration extends radially outward from the hole, and wherein the connected free ends are secured with respect to the rotor so as to remain in the radially outward extending position during rotation of the rotor.

These and other objects, features and advantages of the present invention will become more apparent from the following description when taken in connection with the accompanying drawings, which show, for the purposes of illustration only, one embodiment in accordance the present invention.

BRIEF DESCRIPTION OF THE DRAWINGS

FIG. 1 is a schematic illustration of a prior art two-pole brushless generator;

BEST MODE FOR CARRYING OUT THE INVENTION

Figure 4:
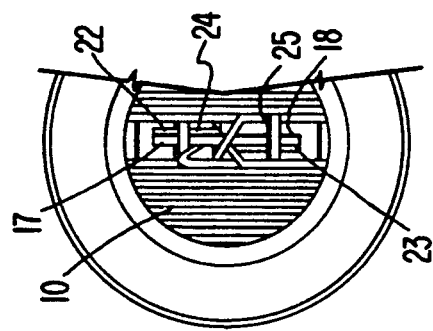
FIG. 4 is a end view depicting a portion of the rotor as seen from the right side of FIG. 3.

Referring now to the drawings, a prior art brushless, two-pole rotary electric generator 1 is shown schematically in FIG. 1. As seen therein, the generator includes a rectifier assembly 2 which is carried within an elongated shaft 3 journalled by bearings, for example. The shaft 3 also carries a series of permanent magnets 4 thereon. A stator 5 provided with windings 6 surrounds the magnets 4 and defines a permanent magnet generator therewith. Electrical current generated in the windings 6 during rotation of the shaft 3 is provided via suitable conductors to windings 7 in an exciter stator 8. Axially aligned with the exciter stator 8 and carried by the shaft 3 are exciter windings 9 in which current will be induced during rotation of the shaft.

The current induced in the windings 9 is fed to the rectifier assembly 2 contained within the shaft 3 where it is rectified to direct current, from the three-phase alternating current supplied to the rectifier assembly. Direct current from the rectifier 2 is then fed to a main field winding 10 carried by the shaft 3. The main field winding is rotatable in alignment with a main generator stator 12. The stator 12 includes windings 11 in which an alternating current is induced and which, by conductors, not shown, the windings are connected to the intended loads. An engine, such as an aircraft engine, can be used to rotate the shaft 3 of the brushless generator 2 for generating AC electrical power. During this rotation the rectifier assembly 2 and shaft 3 are rotated about the axis A—A at high speeds, for example up to 30,000 rpm.

The shaft 3 is provided with an oil inlet 13 and an oil outlet 14 at its opposite ends for cooling the generator 1. Oil introduced into the shaft is used for cooling the windings 9 and 10 as well as the rectifier assembly 2 and may be used for lubrication purposes in connection with bearings rotatably supporting a shaft 3.

Figure 2:
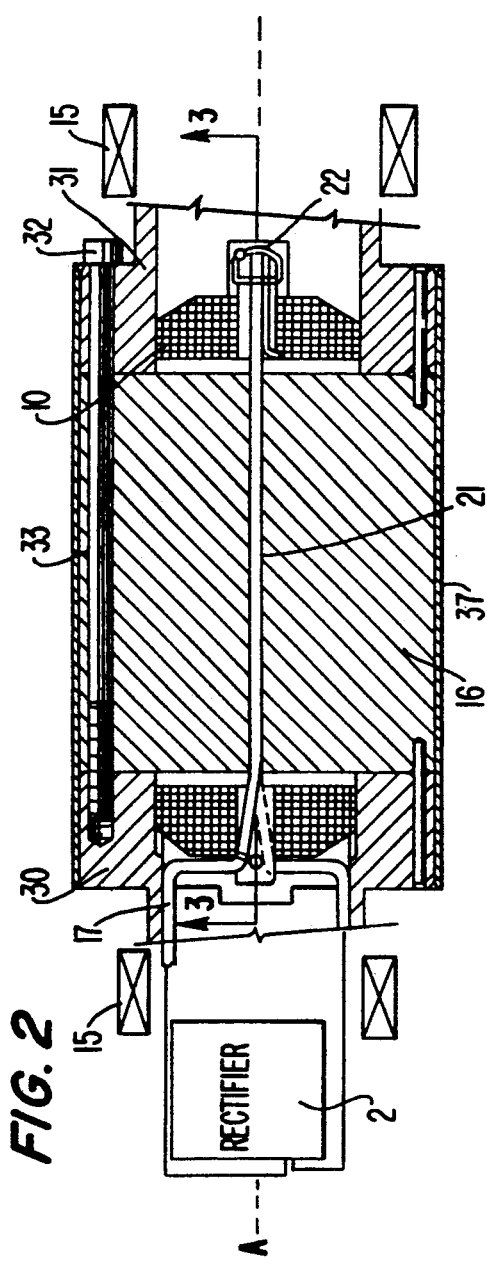
FIG. 2 is a partially schematic, cross-sectional view of a rotor of the type shown in the generator of FIG. 1 in which the present invention has been employed, the cross-sectional view of the rotor being taken of rotation of the rotor and illustrating a portion of the rotor including a rectifier, and a magnetic core and field winding of the main generator, and electrical connections between leads of from the rectifier and the field winding.
Figure 3:
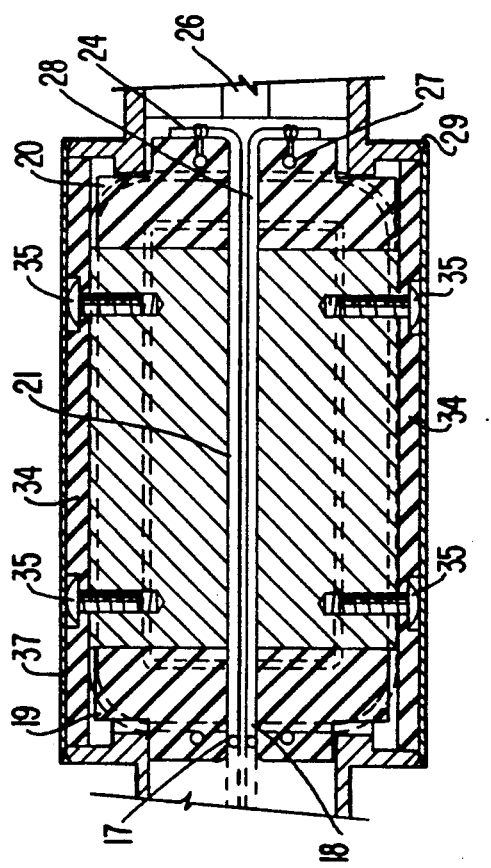
FIG. 3 is a cross-sectional view of the rotor taken along the line III—III in FIG. 2.

Referring to FIGS. 2, 3 and 4 according to the present invention, it is seen that the shaft or rotor 3 of the generator 1 of the invention is supported for rotation about the axis A—A by bearings 15. The rotor 3 includes a laminated magnetic core 16 of the main generator about which the main field winding 10 is wound to form a two-pole generator rotor. The rotor 3 also includes the rectifier assembly 2 and the exciter winding 9, not shown. The rectifier rectifies the electrical output of the exciter winding for transmission of direct current to the main field winding 10 of the main generator by way of flexible wire leads 17 and 18. The exciter winding 9 and rectifier 2 are located to one side of the magnetic core 16 and main field winding 10 in a direction along the axis of rotation A—A of the rotor. The two direct current output leads 17 and 18 are connected at one end to the rectifier 2 by means of terminal lugs secured to the ends of the lead wires and screws threadedly received at connections with the left end of the diode rectifier 2 as schematically shown in FIG. 2. The flexible leads extend about the outer periphery of the rectifier 2 and within the shaft 3 to the main field winding 10 and core 16 where they extend completely through the main field winding and core and also field winding insulators 19 and 20 on respective ends of the field winding by way of a hole 21 extending therethrough along the axis A—A. The free ends of the rectifier leads 17 and 18 emerging from the hole 21 on the other side of the magnetic core 16 and the leads 22 and 23 from the main field winding are connected in respective pairs at connections 24 and 25 in the manner illustrated in FIGS. 3 and 4.

More particularly, the connection 24 between the rectifier lead 17 and the main field winding lead 22 and the connection 25 between the rectifier lead 18 and the main field winding lead 23 are located radially outward from the axis A—A and hole 21 and adjacent the field winding insulator 20. The main field winding 10 is continuously wound in a manner which is started and finished at the core end opposite from the rectifier 2 so that the ends of the main field winding form the leads 22 and 23 which extend through the hole 21 in the field winding insulator 20. Together with the respective rectifier leads 17 and 18, the leads are arranged in parallel splice configurations which extend radially outward from the hole 21 in opposite directions. The parallel lead ends are connected at 24 and 25 by soldering, brazing, crimping or using compressive devices like screw terminals. The connected ends of the leads are secured adjacent the insulator 20 by ties 26 and 27 which extend through holes 28 and 29 in the field winding insulator 20. The ties 26 and 27 can be formed of a glass cord, Dacron (a polyester fiber), Nomex (trademark for a heat-resistant nylon, the copolymer of meta-phenylenediene and isophthaloyl chloride) or other material which is saturated with epoxy after tying so the ties do not become unraveled during operation of the generator. The rectifier leads 17 and 18 are stranded wire leads of copper, for example, with Teflon (tetrafluoroethylene fluorocarbon polymers) insulation. The individual laminae of the laminated magnetic core 16 are conveniently punched with one or more holes on or about the axis of A—A during their formation so that one more holes 21 are formed in the core 16 for passage of the rectifier leads 17 and 18 through the core. As a result of the disclosed arrangement of the leads and lead connections, rotational forces will not pull the lead wire connections apart and the connections are accessible for repair at the right end of the main generator. The leads and connections are also resistant to failure from low cycle, start-stop fatigues.

Access for such a repair is through the shaft inside diameter as the core is made inseparable with welds. Winding support wedges 34 about the circumference of the field windings are also secured to the core by fasteners 35 as shown in FIG. 3. As a containment, sleeve 37 surrounds the insulation spacers 34, shaft end portions 30 and 31, core 16 and main field winding 10 to contain them during high speed rotation and also to constitute a shaft for transmitting torque. The containment sleeve can be formed of high strength Inconel (trademark for a group of corrosion-resistant alloys of nickel and chromium), for example, and is preferably arranged over the core and shaft ends by a shrink fit or press fit procedure.

While we have shown and described only one embodiment in accordance with the present invention, it is understood that the same is not limited thereto, but is susceptible to numerous changes and modifications as known to those skilled in the art. For example, it is envisioned that the generator and method of securing connections between at least two flexible leads of electrical components of a rotor which is a rotated about an axis of the rotor, are applicable to generators and other apparatus apart from the brushless two-pole generator of the preferred embodiment, so that rotational forces will not pull the lead wire connections apart and so that low cycle start-stop fatigue will not degrade the wire connections. Therefore, we do not wish to be limited to the details shown and described herein, but intend to cover all such changes and modifications as are encompassed by the scope of the appended claims.

We claim:

1. An electric generator comprising an exciter and a main generator, said exciter and said main generator having a common rotor; means for rotatably supporting said rotor for rotation about an axis of the rotor, said rotor including a magnetic core and field winding of the main generator; an exciter winding and a rectifier for rectifying the electrical output of the exciter winding for transmission to the field winding of the main generator, said exciter winding and said rectifier being located in said rotor to one side of the magnetic core and the field winding of the main generator in a direction along the axis of rotation of the rotor; and wherein electrical leads from said rectifier extend through a hole in said rotor to the other side of said magnetic core and field winding opposite said one side of the magnetic core and field winding of the main generator where the electrical leads form said rectifier are connected to respective leads from said field windings thereby forming electrical connections, wherein the field winding leads and the rectifier leads are arranged in parallel splice configurations in the locations of the electrical connections, the lead ends of the field winding leads and the rectifier leads in the parallel splice configurations extending radially outward from the hole with respect to said axis of rotation of the rotor whereby rotation forces will not pull the electrical connections apart.

2. A generator according to claim 1 wherein said hole in same motor extends along the axis of rotation of said rotor from one side of the core and field winding to the other.

3. A generator according to claim 1, wherein a field winding insulator is provided over the field winding at least adjacent said other side of the magnetic core and field winding, the electrical connections of the field winding leads and the rectifier leads being located adjacent said field winding insulator.

4. A generator according to claim 3, wherein said insulator includes means for securing the connected ends of the electrical leads from the rectifier adjacent the insulator.

5. A generator according to claim 4, wherein said means for securing includes holes in the insulator and ties extending through the holes in the insulator and about said leads for securing the ends of the electrical leads from the rectifier and the field winding adjacent the insulator.

6. A generator according to claim 3, wherein the hole in said rotor extends through said insulator adjacent said other side of the magnetic core and field winding, both said rectifier leads and said field winding leads extending through the hole in said insulator to the electrical connections whereby the electrical connections are accessible from the axial end of said magnetic core and field winding of the generator.

7. A generator according to claim 1, wherein the electrical connections are each made by soldering, brazing, crimping or with the use of a compressive device such as a screw terminal.

8. A generator according to claim 1, wherein said generator is a brushless two-pole generator.

9. A generator according to claim 1, wherein said means for rotatably supporting the rotor comprises spaced bearings which support the rotor, and wherein said magnetic core and said field winding are located within an external sleeve of the rotor which transmits torsion along the rotor and gives support between said bearings while the shaft is rotating.

10. A generator according to claim 1, wherein said hole in the rotor extends through said magnetic core.

11. A method of securing a connection between at least two flexible electrical leads of electrical components of a rotor which is rotatable about an axis of the rotor, comprising the step of arranging the leads so that they extend through a generally axially extending hole in the rotor with their free ends being connected in a parallel splice configuration of the ends which extends radially outward from the hole, and wherein said method further comprises the step of securing the connected free ends with respect to said rotor so as to remain in said radially outward extending position during rotation of the rotor.

12. A method according to claim 11, wherein said electrical components include a rectifier and a main generator field winding, and wherein said step of arranging includes extending the electrical leads from the rectifier and the field winding through said generally axially extending hole in the rotor.

13. A method according to claim 12, wherein said rotor further includes a field winding insulator over at least one end of the field winding, said hole extending through the insulator, and wherein the step of securing includes securing the connected free ends of the leads to said insulator.

14. A method according to claim 12, wherein said electrical components further comprise a generator core about which said field winding is wound, said rectifier being located on one side of the generator core and field winding along the axis of the rotor and said hole extending through said generator core from said one side to the opposite side thereof, and wherein said step of arranging further includes extending flexible electrical leads from the rectifier completely through the generator core and connecting them to flexible electrical leads of said winding.

* * * * *